United States Patent
Kim (10) Patent No.: US 8,978,810 B2
(45) Date of Patent: Mar. 17, 2015

(54) TRACTOR

(75) Inventor: Joong-Ho Kim, Chungcheongbuk-do (KR)

(73) Assignee: Daeho Co., Ltd., Chungcheongbuk-Do (KR)

( * ) Notice: Subject to any disclaimer, the term of this patent is extended or adjusted under 35 U.S.C. 154(b) by 29 days.

(21) Appl. No.: 13/877,647

(22) PCT Filed: May 24, 2011

(86) PCT No.: PCT/KR2011/003778
§ 371 (c)(1),
(2), (4) Date: Apr. 3, 2013

(87) PCT Pub. No.: WO2012/050282
PCT Pub. Date: Apr. 19, 2012

(65) Prior Publication Data
US 2013/0186703 A1     Jul. 25, 2013

(30) Foreign Application Priority Data
Oct. 11, 2010   (KR) ........................ 10-2010-0098565

(51) Int. Cl.
| | | |
|---|---|---|
| B60K 17/34 | (2006.01) | |
| B60K 17/344 | (2006.01) | |
| B60K 17/348 | (2006.01) | |
| B62D 7/18 | (2006.01) | |
| B60B 37/00 | (2006.01) | |
| B62D 9/00 | (2006.01) | |
| B60K 17/30 | (2006.01) | |

(52) U.S. Cl.
CPC . *B60K 17/34* (2013.01); *B62D 7/18* (2013.01); *B60B 37/00* (2013.01); *B60K 17/348* (2013.01); *B62D 9/00* (2013.01); *B60K 17/303* (2013.01); *B60W 2300/152* (2013.01)

USPC .......... 180/233; 180/240; 180/245; 180/248; 180/252

(58) Field of Classification Search
USPC ......... 180/233, 245, 248, 234, 236, 237, 238, 180/239, 240, 241, 246, 247, 251, 252, 253, 180/254, 256, 257, 258, 259, 260, 261, 262, 180/263
See application file for complete search history.

(56) References Cited

U.S. PATENT DOCUMENTS

| | | | | |
|---|---|---|---|---|
| 2,267,562 | A * | 12/1941 | Higgins | 180/24 |
| 4,597,468 | A * | 7/1986 | Friedrich | 180/255 |
| 5,090,510 | A * | 2/1992 | Watanabe et al. | 180/197 |
| 6,237,708 | B1 * | 5/2001 | Kawada | 180/53.7 |
| 6,834,738 | B2 * | 12/2004 | Kobayashi | 180/233 |
| 6,932,179 | B2 * | 8/2005 | Sakikawa et al. | 180/242 |
| 6,976,553 | B1 * | 12/2005 | Dahl et al. | 180/247 |
| 7,425,006 | B2 * | 9/2008 | Worman, Jr. | 280/124.166 |
| 7,465,246 | B2 * | 12/2008 | Okamuro | 475/230 |
| 7,690,470 | B2 * | 4/2010 | Iwaki et al. | 180/252 |
| 7,922,185 | B2 * | 4/2011 | Worman, Jr. | 280/124.107 |
| 2007/0105683 | A1 * | 5/2007 | Irikura et al. | 475/230 |
| 2008/0283324 | A1 * | 11/2008 | Iwaki et al. | 180/242 |
| 2009/0049833 | A1 * | 2/2009 | Sakakura et al. | 60/484 |
| 2009/0120710 | A1 * | 5/2009 | Hasegawa et al. | 180/365 |
| 2012/0043159 | A1 * | 2/2012 | Clark et al. | 182/69.6 |

\* cited by examiner

*Primary Examiner* — Joseph Rocca
*Assistant Examiner* — Marc A Scharich
(74) *Attorney, Agent, or Firm* — John K. Park; Park Law Firm (57) ABSTRACT

The present invention provides a tractor which is configured such that front wheel axles are disposed above upper portions of front wheels so that the front wheels are prevented from being impeded by the front wheel axles even when the front wheels are steered to maximum angles in a clockwise or counterclockwise direction and turned to an angle over or approximate to a right angle with respect to the longitudinal direction of the tractor, whereby the tractor can be turned in place by manipulating a steering wheel.

10 Claims, 6 Drawing Sheets

TRACTOR

TECHNICAL FIELD

The present invention relates, in general, to tractors, and more particularly, to a tractor which is configured such that front wheel axles are disposed above upper portions of front wheels so that the front wheels are prevented from being impeded by the front wheel axles even when the front wheels are steered to maximum angles in a clockwise or counterclockwise direction and turned to an angle over or approximate to a right angle with respect to the longitudinal direction of the tractor, whereby the tractor can be turned in place by manipulating a steering wheel.

BACKGROUND ART

Generally, a tractor is an engineering vehicle designed to deliver a high tractive force and conduct different kinds of work in the agriculture or construction field. At present, tractors for agriculture typically include a front loader provided on a front end of a tractor body, and an attachment mounted to the front loader so as to conduct various kinds of work, such as transportation, unloading, loading, etc. Furthermore, a rotavator or the like is mounted to a rear end of the tractor body by a rear connection link so that work such as plowing work can be conducted.

In such tractors for agriculture, power generated from an engine is classified into movement-related power which is transmitted to wheels through a transmission to enable a tractor to move, and PTO (power take-off)-related power which is used to drive different kinds of operating implements mounted to the tractor. To embody transmission of the movement-related power, a four-wheel drive system is typically used.

In the power system and structure of a typical four-wheel drive tractor, power generated from an engine such as a diesel engine is transmitted to a transmission through a clutch. The transmission conducts speed and torque conversion to provide controlled application of the power of the engine in response to movement conditions of the tractor and transmits the controlled power to a front wheel propulsion shaft and a rear propulsion shaft. The power transmitted to the front wheel propulsion shaft and the rear wheel propulsion shaft is transmitted to a front wheel differential device and a rear wheel differential device, respectively.

However, the power system of the conventional tractor is problematic in that, because the power of the engine is first sent to rear wheel axles and then transmitted from the rear wheel axles to front wheel axles, the rear wheel axles may forcibly propel the front wheel axles when the rear wheels of the rear wheel axles are not reduced in speed.

Typically, the conventional tractor is configured such that when a driver rotates a steering wheel in a clockwise or counterclockwise direction, the front wheels are turned to the left or the right by a steering apparatus. In the case where the front wheel axles are directly coupled to the respective front wheels, when the steering wheel is completely rotated, angles to which the front wheels can be turned cannot be over 60°. Therefore, although the steering wheel is completely rotated, the minimum turning radius of the tractor is comparatively wide. Thus, when the tractor is required to be turned around, the tractor must repeatedly move forwards and backwards.

The tractor having the above-mentioned construction must run or turn in place depending on conditions of a work site or the kind of work. As stated above, if the minimum turning radius of the tractor is comparatively wide, the tractor cannot cope with a small area or a case where it must turn around in place, thus reducing work efficiency.

DISCLOSURE

Technical Problem

Accordingly, the present invention has been made keeping in mind the above problems occurring in the prior art, and an object of the present invention is to provide a tractor which is configured such that front wheel axles are disposed above upper portions of front wheels so that the front wheels are prevented from being impeded by the front wheel axles even when the front wheels are steered to maximum angles in a clockwise or counterclockwise direction and turned to an angle over or approximate to a right angle with respect to the longitudinal direction of the tractor, whereby the tractor can be turned in place by manipulating a steering wheel.

Technical Solution

In order to accomplish the above object, the present invention provides a four-wheel drive tractor configured such that front wheel axles are disposed above upper portions of front wheels, whereby the front wheels are prevented from being impeded by the front wheel axles, when the front wheels are steered to maximum angles in a clockwise or counterclockwise direction and turned to an angle over or approximate to a right angle with respect to a longitudinal direction of the tractor.

Furthermore, a path along which power is transmitted from the front wheel axles to the front wheels may have a "⌐" shape.

The front wheels of the front wheel axles can be steered, and rear wheels of rear wheel axles cannot be steered.

In addition, a central differential device may be provided to control a difference in rpms of the front wheels and rear wheels with respect to power transmitted from an engine to the front wheels and the rear wheels, and the power may be distributed from the central differential device to a front wheel differential device and a rear wheel differential device, wherein the central differential device, the front wheel differential device and the rear wheel differential device may be disposed to one side at positions displaced from a central portion of a tractor body frame.

The engine may be disposed at a portion of the body frame where the central differential device, the front wheel differential device and the rear wheel differential device are not located.

Furthermore, a driver cab provided with a driver seat may be disposed above an area where the engine is disposed.

The front wheel axles may be disposed at a position higher than rear wheel axles, and a front wheel propulsion shaft may be provided to be inclined upwards, the front wheel propulsion shaft transmitting power from the central differential device to the front wheel differential device.

A central differential device may be provided to transmit power from the engine to the front wheels and the rear wheels and control a difference in the rpms of both of the front wheels and a difference in the rpms of both of the rear wheels such that the front wheels are prevented being pushed by the rear wheels when the front wheels are steered to the maximum angles, and the central differential device may be configured such that the power is transmitted from the central differential device to a front wheel differential device and a rear wheel differential device.

The tractor may further include an auxiliary transmission provided behind a main transmission that changes a speed of the power generated from an engine, wherein the central differential device may be disposed ahead of a side portion of the auxiliary transmission, and the power may be transmitted from the auxiliary transmission to the central differential device by a power transmission shaft.

Each of the front wheel axles may be provided at an end thereof with a bevel gear, and a bevel gear shaft that extends downwards may be connected to the bevel gear so that the corresponding front wheel is driven.

The bevel gear shaft may be housed in a swing housing provided so as to be rotatable, wherein the swing housing may be rotated by a steering cylinder operated by manipulating a steering wheel, whereby the front wheel is turned.

A steering apparatus may be provided ahead of the front wheel axles, the steering apparatus turning the front wheels, and including: a steering cylinder operated by steering force transmitted by hydraulic pressure when the steering wheel is manipulated; and cylinder rods extended and retracted by extension and retraction operation of the steering cylinder, wherein a four-bar link structure is provided on an end of each of the cylinder rods so that the corresponding front wheel can be turned.

The steering cylinder may be supported by a steering cylinder bracket installed on a front wheel axle housing, wherein the steering cylinder bracket may support the steering cylinder such that the steering cylinder is prevented from being moved to the left or the right and is allowed to be moved forwards or rearwards by a predetermined distance.

Each of the four-bar link structures may include: a swing link hinged at a first end thereof to the corresponding cylinder rod and hinged at a second end thereof to an upper surface of the corresponding front wheel axle; a rod link hinged at a first end thereof to the cylinder rod and the swing link and hinged at a second end thereof to a swing arm; and the swing arm coupled at an end thereof to an upper end of the swing housing so that the swing housing can be rotated by the swing arm.

The front wheel axles may be disposed ahead of an engine, and a front wheel propulsion shaft may be disposed at a side of the engine.

Advantageous Effects

A tractor according to the present invention is configured such that front wheel axles are disposed above upper portions of front wheels. Thus, the front wheels are prevented from being impeded by the front wheel axles even when the front wheels are steered to maximum angles in a clockwise or counterclockwise direction and turned to an angle over or approximate to a right angle with respect to the longitudinal direction of the tractor. Thereby, the tractor can be turned in place by manipulating a steering wheel. As a result, the tractor can be used in a small place or for different kinds of work such as work that requires the tractor to turn around, whereby the work efficiency of the tractor is enhanced.

Furthermore, in the present invention, a differential device is disposed on a body frame at a position displaced to one side from a central portion of the body frame, and an engine is disposed on an area where the differential device is not located. A driver cab provided with a driver seat is disposed above the area where the engine is located. Therefore, the tractor can have a more stable structure, and the size of the tractor body can be reduced.

Moreover, in the present invention, a four-bar link structure is provided on an end of each of both cylinder rods of a steering cylinder, thus making it possible to absorb shock applied to the front wheel axles in the axial direction.

DESCRIPTION OF THE REFERENCE NUMERALS IN THE DRAWINGS

10: driver cab 21: front wheel
21a: wheel frame 21b: wheel rotating shaft
22: rear wheel 30: body frame
40: articulated arm 41: rotating shaft
50: front wheel axle housing
51: front wheel differential device
52: steering cylinder bracket 53: front wheel axle
54: rear wheel differential device 55: rear wheel axle
61: gear unit housing 62: swing housing
63, 64, 66: bevel gear 65: bevel gear shaft
67: rotating member 68: front-wheel-shaft coupling housing
71: steering cylinder 72: cylinder rod
73: swing link 74: rod link
75: swing arm 110: engine
121: clutch 122: main transmission
123: auxiliary transmission 124: power transmission shaft
130: central differential device
131: front wheel propulsion shaft
132: rear wheel propulsion shaft 133, 134: universal joint

BEST MODE

Hereinafter, a tractor according to the present invention will be described in detail with reference to the attached drawings.

Figure 1:
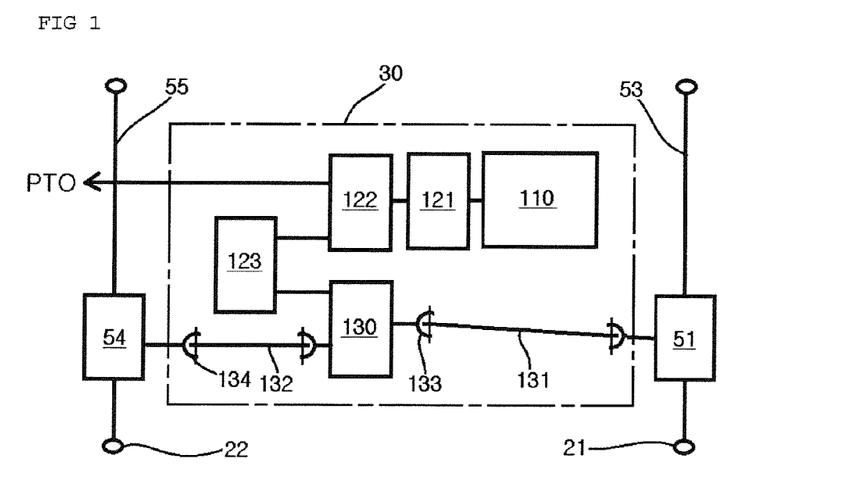
FIG. 1 is a view illustrating a power system of a tractor, according to the present invention.

The tractor according to the present invention is a four-wheel-drive tractor, and a power system and structure thereof will be explained with reference to FIGS. 1 and 4.

Rotating power generated from an engine 110 such as a diesel engine is transmitted via a clutch 121 to a main transmission 122 which changes speed of the power generated from the engine 110. An auxiliary transmission 123 is provided behind the main transmission 122. The auxiliary transmission 123 is connected to a central differential device 130 so that the power can be transmitted to front wheels 21 and rear wheels 22 by the central differential device 130.

Power transmitted from the main transmission 122 is distributed to PTO and the auxiliary transmission 123 that is disposed behind the main transmission 122. The power transmitted from the auxiliary transmission 122 is transmitted to the central differential device 130.

Figure 4:
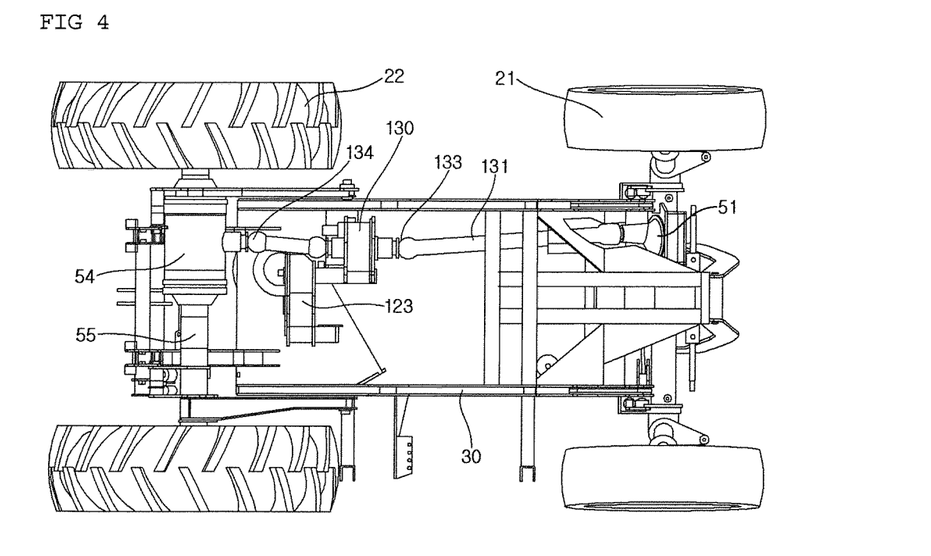
FIG. 4 is a bottom view illustrating the power system of the tractor according to the present invention.

With regard to a structure for transmitting power from the auxiliary transmission 123 to the central differential device 130, as shown in FIG. 4, the central differential device 130 is disposed ahead of a side portion of the auxiliary transmission 123, and power is transmitted from the auxiliary transmission 123 to the central differential device 130 by a power transmission shaft 124.

Thanks to the above-mentioned structure, space required to install a universal joint 134 which is used to transmit power from the central differential device 130 to a rear wheel differential device 54 can be provided. Thereby, the length of a body frame 30 can be prevented from being designed to be excessively long.

The central differential device 130 distributes power to a front wheel propulsion shaft 131 and a rear wheel propulsion shaft 132 which are respectively connected to universal joints 133 and 134. The front wheel propulsion shaft 131 and the rear wheel propulsion shaft 132 respectively transmit power to a front wheel differential device 51 and the rear wheel differential device 54.

Each of the central differential device 130, the front wheel differential device 51 and the rear wheel differential device 54 includes a final reduction gear and a differential gear. The final reduction gears of the front and rear wheel differential devices finally reduce speed of power transmitted to the front wheel propulsion shaft and the rear wheel propulsion shaft (in a ratio of 4-8:1), convert the direction of the transmission of power at an approximate right angle, and respectively transmit the power to front wheel axles 53 and rear wheel axles 55. The differential gears make it possible to vary the rpms of both side wheels of the front wheels 21 and the rear wheels 22, whereby when the tractor runs on an uneven road or turns, the wheels can easily and smoothly rotate. The present invention includes the three differential devices, that is, the central differential device 130, the front wheel differential device 51 and the rear wheel differential device 54 so that the tractor can be operated in an AWD (all wheel drive) manner.

The central differential device 130 controls a difference in the rpms of both front wheels 21 and a difference in the rpms of both rear wheels 22 such that the front wheels 21 are prevented from being pushed by the rear wheels 22 when the front wheels 21 are steered to the maximum angles. The central differential device 130 transmits power to the front wheel differential device 51 and the rear wheel differential device 54.

The central differential device 130, the front wheel differential device 51 and the rear wheel differential device 54 are disposed at positions displaced to one side from the central portion of the body frame 30. Furthermore, the engine 110 is disposed at a portion of the body frame 30 where the central differential device 130, the front wheel differential device 51 and the rear wheel differential device 54 are not located.

Furthermore, the front wheel axles 51 are disposed ahead of the engine 110 rather than being disposed just under the engine 110. The front wheel propulsion shaft 131 is disposed at a side of the engine 110.

Thanks to the above-mentioned arrangement of the elements, the position of the engine 110 can be lowered so that the center of gravity of the tractor can also be lowered. Further, the front wheel axles 53 can be disposed higher than the rear wheel axles 55 so that the front wheels 21 can be prevented from being impeded by the front wheel axles 53 when they are turned to the maximum angles.

In addition, a driver cab 10 provided with a driver seat is disposed above the area where the engine 110 is located such that the driver cab 10 is displaced to one side from the central portion of the body frame 30.

The front wheel axles 53 are disposed at a position higher than the rear wheel axles 55. The front wheel propulsion shaft 131 which transmits power from the central differential device 130 to the front wheel differential device 51 is inclined upwards.

Figure 2:
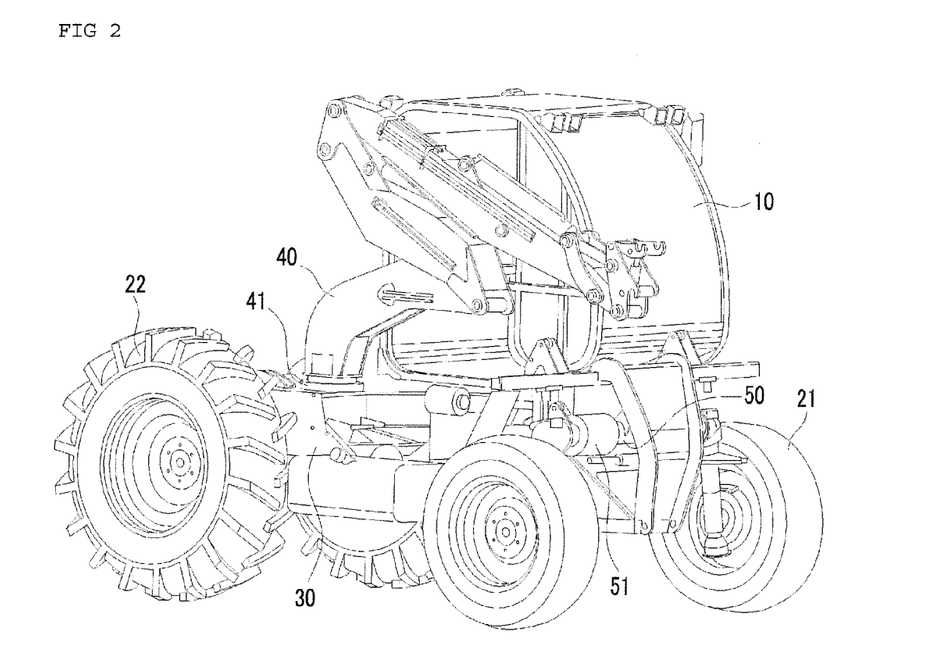
FIG. 2 is a perspective view showing an embodiment of the tractor according to the present invention.

In an embodiment of the tractor according to the present invention, as shown in FIG. 2, the driver cab 10 having the driver seat is located on a left side portion of the body frame 30. An articulated arm 30, which is coupled to a rotating shaft 41 and that can be rotated along with the rotating shaft 41, is disposed on the tractor in an area other than the area of driver cab 10 so as to maintain the balance of the tractor. In detail, the driver cab 10 is positioned between the front wheels 21 and the rear wheels 22 of the tractor and located on the left side portion of the tractor such that a space is formed beside the driver cab 10. Thus, when the articulated arm 40 is not in use, the articulated arm 40 is maintained in this space. The present invention is not limited to the structure illustrate in FIG. 2.

A structure that makes it possible for the tractor to turn in place will be described in detail with reference to FIGS. 3 and 5 through 10.

Figure 3:
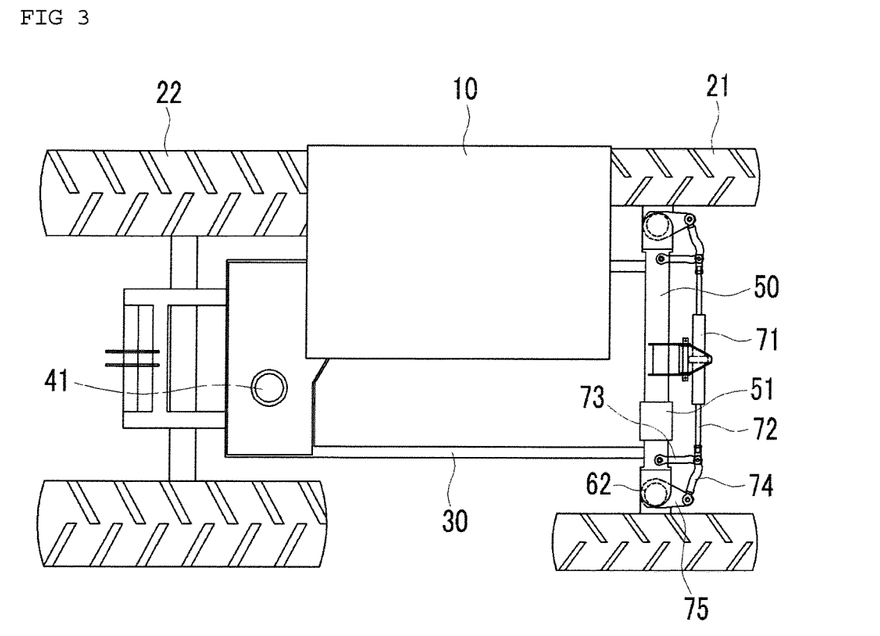
FIG. 3 is a plan view showing a critical portion of the tractor according to the present invention.
Figure 5:
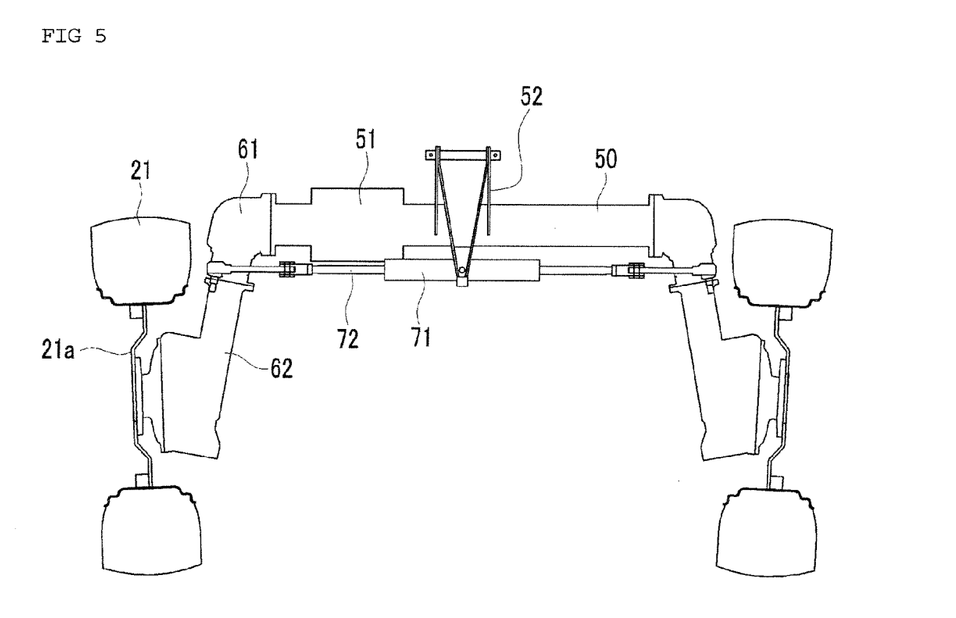
FIG. 5 is a front view of a front wheel part of the tractor according to the present invention.

In the tractor according to the present invention, power generated from the engine 110 is transmitted to the front wheel differential device 51 and the rear wheel differential device 54 via the main transmission 122, the auxiliary transmission 123 and the central differential device 130. Power transmitted to the front wheel differential device 51 is transmitted to the front wheels 21 through the front wheel axles 53 which extend from the front wheel differential device 51 to the left and the right. The front wheel axles 53 are housed in a front wheel axle housing 50 which is provided to protect the front wheel axles 53. The front wheel axles 53 are disposed above the upper portions of the front wheels 21.

As such, because the front wheel axles 53 are disposed above the upper portions of the front wheels 21, even when the front wheels 21 are steered to the maximum angles in the clockwise or counterclockwise direction and are thus turned to an angle over or approximate to a right angle with respect to the longitudinal direction of the tractor, the front wheels 21 can be prevented from being impeded by the front wheel axles 53 or the front wheel axle housing 50 which houses the front wheel axles 53 therein.

As shown in FIG. 5, a path along which power is transmitted from the front wheel axles 53 to the front wheels 21 has a ⊓ shape, and a power transmission structure will be explained below.

Figure 7:
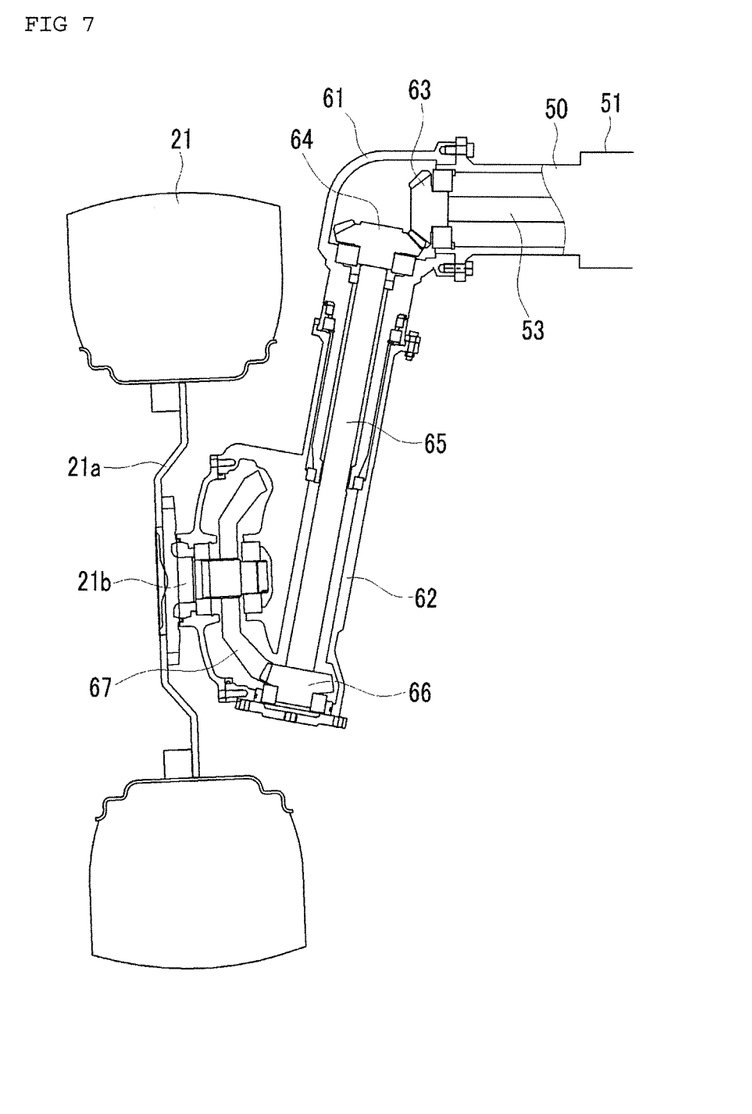
FIG. 7 is a view illustrating a drive device of the front wheel part of the tractor according to the present invention in detail.

As shown in FIG. 7, power is horizontally transmitted from the front wheel differential device 51 to the left and right front wheel axles 53. Bevel gears 63 and 64 are provided on an end of each front wheel axle 53 and convert the direction of power transmission such that power transmitted to the front wheel axle 53 acts in the vertical direction. A bevel gear shaft 65 extends downwards from the bevel gear 64. A bevel gear 66 is provided on a lower end of the bevel gear shaft 65. The bevel gear 66 engages with a rotating member 67 which is provided to rotate the corresponding front wheel 21. The rotating member 67 is housed in a front-wheel-shaft coupling housing 68.

A gear unit housing 61 is coupled to an end of the front wheel axle housing 50 by a flange coupling structure. The gear unit housing 61 functions to protect the bevel gears 63 and 64 and prevent foreign substances from entering the front wheel axle housing 50. A swing housing 62 is coupled to a lower end of the gear unit housing 61 such that the swing housing 62 can be rotated with respect to the gear unit housing 61 by operation of a steering apparatus. The bevel gear shaft 65, the bevel gear 66 and the rotating member 67 are housed in the swing housing 62.

Each front wheel 21 includes a wheel frame 21a, over which a tire is fitted. A wheel rotating shaft 21b is provided on a central portion of the wheel frame 21a. The wheel rotating shaft 21b is coupled to the rotating member 67 so that the front wheel 21 is rotated by the rotation of the rotating member 67.

Figure 6:
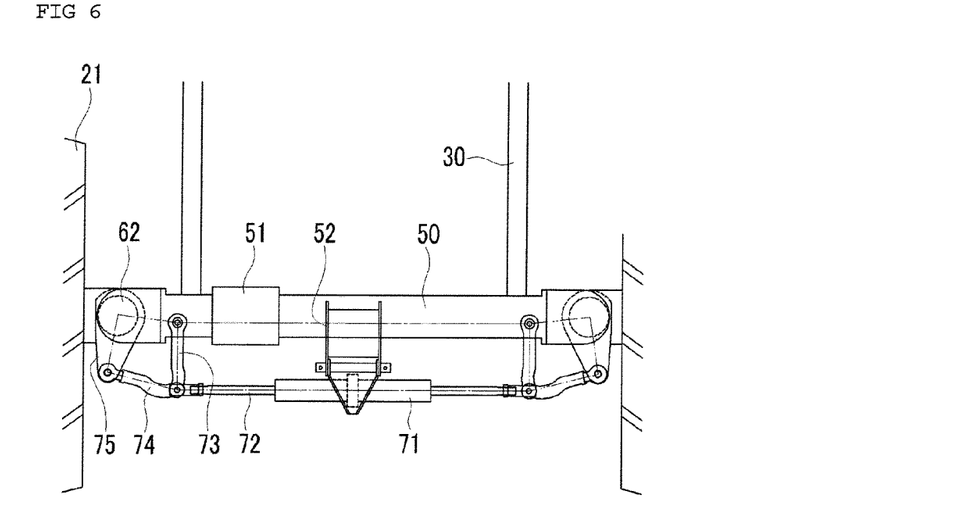
FIG. 6 is a plan view of the front wheel part of the tractor according to the present invention.

As shown in FIGS. 3 and 6, a steering apparatus is installed ahead of the front wheel differential device 51 and the front wheel axle housing 50. The steering apparatus includes a steering cylinder 71 which is provided in front of the front wheel axle housing 50 at a position spaced apart from the front wheel axle housing 50 by a predetermined distance and is oriented parallel to the front wheel axle housing 50. The steering cylinder 71 includes left and right cylinder rods 72 which are extended and retracted to the left and the right by steering force transmitted by hydraulic pressure when the driver manipulates the steering wheel. Ends of the left and right cylinder rods 72 are respectively hinged to swing links 73, thus forming a first four-bar link structure. Second four-bar link structures are formed on left and right sides of the first four-bar link structure. These structures make it possible to steer the front wheels.

The first four-bar link structure is configured such that first ends of the left and right swing links 73 are hinged to the front wheel axle housing 50 and second ends thereof are respectively hinged to the ends of the left and right cylinder rods 72. Thus, when the left and right cylinder rods 72 are extended and retracted so that they move to the left or the right, the left and right swing links 73 are swung to the left or the right.

Each second four-bar link structure includes the swing link 73, a swing arm 75 which is provided on the end of the front wheel axle housing 50 to steer the front wheel, and a rod link 74 which is hinged at a first end thereof to the swing arm 75 while a second end thereof is hinged to the swing arm 75.

As such, the first four-bar link structure is formed both by the steering cylinder 71 having the left and right cylinder rods 72 and by the two swing links 73. In addition, the second four-bar link structures are respectively provided on the left and right sides of the first four-bar link structure. As a result, the angular range within which the front wheels 21 can be steered can be increased. Further, when the front wheels 21 are steered, they can be controlled such that the steering angle of the front wheel that is disposed at a side corresponding to the direction in which the tractor turns is larger than the steering angle of the front wheel that is disposed at the other side, thus making the turning of the tractor smoother.

The front wheel differential device 51, the front wheel axle 53 and the front wheel axle housing 50 are disposed at appropriate heights so as to not impede the front wheels 21 when the front wheels 21 turn to 90° or more.

Figure 8:
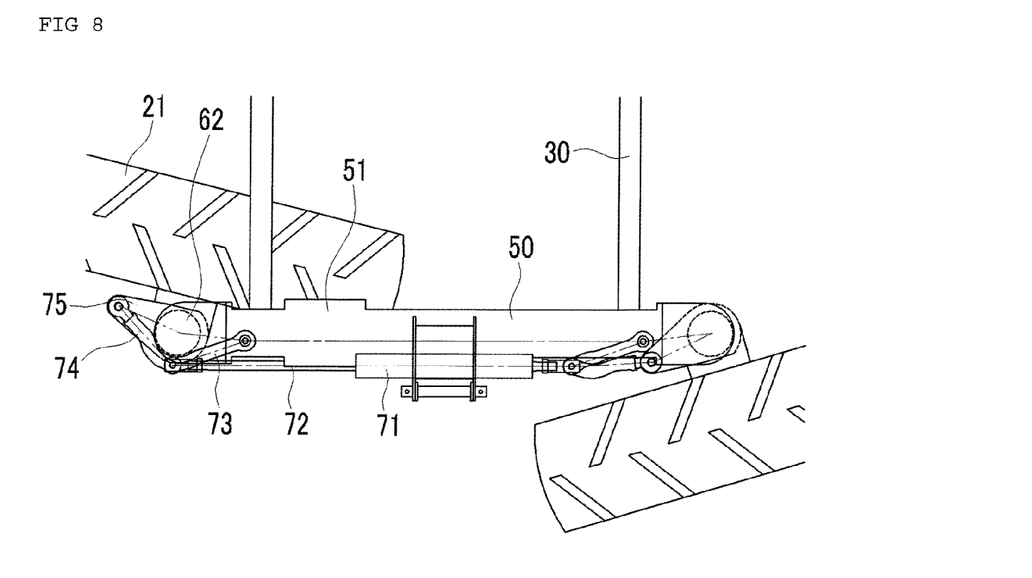
FIG. 8 is a view showing the front wheels of the tractor which have been steered to the maximum angles in the clockwise direction.

In the tractor having the above-mentioned construction, when the driver completely rotates the steering wheel in the clockwise direction, the front wheels enter the state of FIG. 8.

In the present invention, as shown in FIG. 8, when the driver completely rotates the steering wheel in the clockwise direction, an inside one (the left wheel of FIG. 8) of the front wheels 21 can be turned to 90° or more (in a range of 95° to 105°, and an outside one (the right wheel of FIG. 8) can be turned to an angle of less than 90° (in a range of 80° to 89°).

Figure 9:
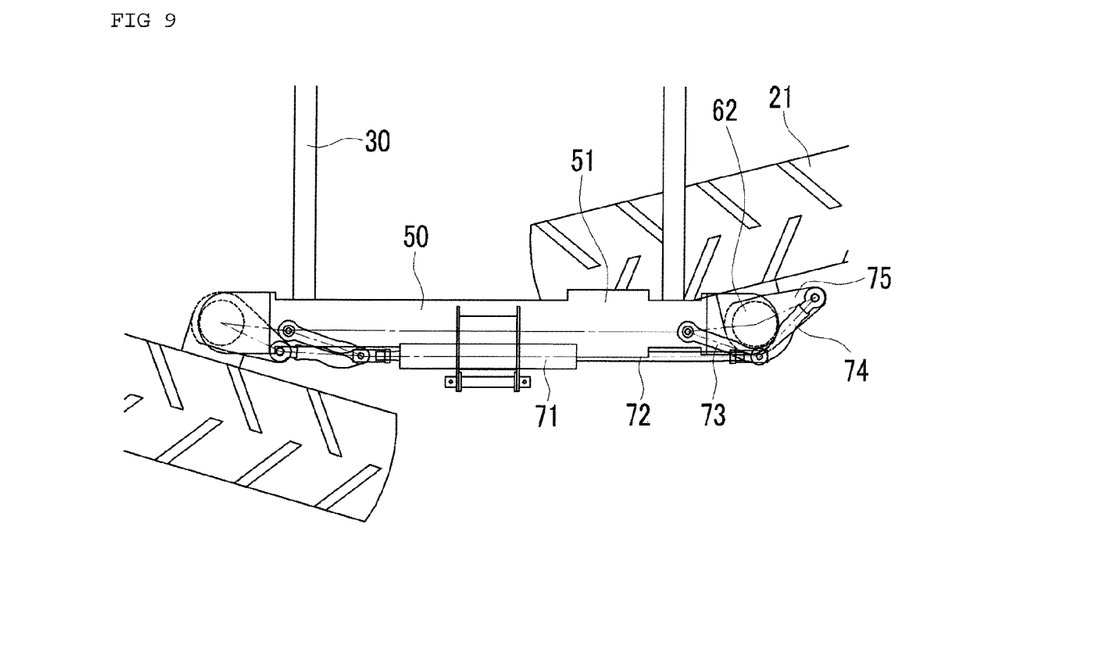
FIG. 9 is a view showing the front wheels of the tractor which have been steered to the maximum angles in the counterclockwise direction.

Furthermore, as shown in FIG. 9, when the driver completely rotates the steering wheel in the counterclockwise direction, an inside one (the right wheel of FIG. 9) of the front wheels 21 can be turned to 90° or more (in a range of 95° to 105°), and an outside one (the left wheel of FIG. 9) can be turned to an angle of less than 90° (in a range of 80° to 89°).

Because the inner wheel is turned along with the outer wheel by the steering apparatus, the angle to which the inner wheel (the left wheel of FIG. 8 or the right wheel of FIG. 9) of the front wheels 21 is completely turned is determined by a maximum turning angle to which the outer wheel (the right wheel of FIG. 8 or the left wheel of FIG. 9) can be turned.

Preferably, the maximum turning angles of the inner wheel and the outer wheel are limited to angles at which the tractor can turn in place with the minimum turning radius. Here, the turning angles of the front wheels 21 at which the tractor can turn in place with the minimum turning radius can be determined by width and length of a rectangle defined by the front wheels 21 and the rear wheels 22. Preferably, the maximum turning angle of the inner wheel of the front wheels 21 is limited to a predetermined angle within a range of 95° to 105° with respect to the straight running direction of the tractor, and the maximum turning angle of the outer wheel of the front wheels 21 is limited to a predetermined angle within a range of 80° to 89° with respect to the straight running direction of the tractor.

In this case, to turn the tractor in place in a desired direction (in the clockwise direction or the counterclockwise direction), if the driver completely rotates the steering wheel in the desired direction (in the clockwise direction or the counterclockwise direction) and then drives the tractor, the tractor can be turned in place in the desired direction.

Figure 10:
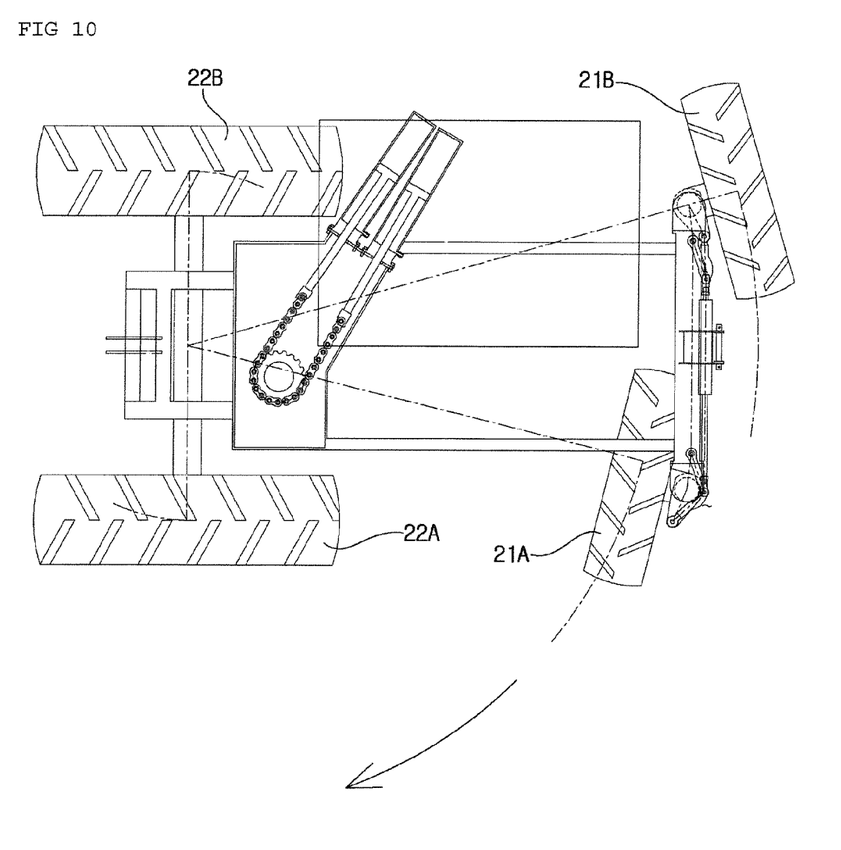
FIG. 10 is a view showing turning motion of the tractor after the front wheels have been steered to the maximum angles in the clockwise direction.

FIG. 10 is a view showing the turning motion of the tractor after the front wheels have been steered to the maximum angles in the clockwise direction. The operation of turning the tractor of the present invention in place will be explained with reference to FIG. 10.

As shown in FIG. 10, after the driver has completely turned the steering wheel in the clockwise direction so that the front wheels 21 have been steered to the maximum angles in the clockwise direction, if the driver drives the tractor, both of the front wheels 21 and both of the rear wheels 22 are rotated at different angular speeds by the front wheel differential device 51 and the rear wheel differential device 54.

That is, the outer wheel 21B of the front wheels 21 rotates at the highest speed. The inner wheel 21A of the front wheels 21 rotates at a speed that is lower than the outer wheel 21B but higher than the rear wheels 22. The outer wheel 22B of the rear wheels 22 rotates at a speed that is lower than that of the inner wheel 21A of the front wheel 21 but higher than that of the other rear wheel 22A. The inner wheel 22A of the rear wheels 22 remains in an almost stopped state. As a result, the tractor can turn in place.

In FIG. 10, although the turning motion of the tractor when the front wheels 21 are completely rotated in the clockwise direction has been illustrated, the principle of the turning motion of the tractor when the front wheels 21 are completely rotated in the clockwise direction is the same as that of FIG. 10.

As described above, in the tractor according to the present invention, when the front wheels 21 are steered to the maximum angles in the clockwise direction or counterclockwise direction by rotating the steering wheel, the tractor can be turned in place so that it can be used even in a small place and in various kinds of work, for example, in work that requires the tractor turning in place.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A four-wheel drive tractor configured such that front wheel axles are disposed above upper portions of front wheels, whereby the front wheels are prevented from being impeded by the front wheel axles when the front wheels are steered to maximum angles in a clockwise or counterclockwise direction to an angle greater than or approximate to a right angle with respect to a longitudinal direction of the tractor,
wherein a central differential device is provided to control a difference in revolutions per minute (rpm) of the front wheels and rear wheels with respect to power transmitted from an engine to the front wheels and the rear wheels, and the power is distributed from the central differential device to a front wheel differential device and a rear wheel differential device, wherein the central differential device, the front wheel differential device and the rear wheel differential device are each disposed at a same side of a tractor body frame of the tractor at positions laterally displaced from a central portion of the tractor body frame,
wherein the front wheels of the front wheel axles can be steered, and the rear wheels of rear wheel axles cannot be steered.

2. The tractor according to claim 1, wherein the central differential device is provided to transmit power from the engine to the front wheels and the rear wheels and control a difference in the revolutions per minute (rpm) of both of the front wheels and a difference in the revolutions per minute (rpm) of both of the rear wheels such that the front wheels are prevented from being pushed by the rear wheels when the front wheels are steered to the maximum angles.

3. A four-wheel drive tractor configured such that front wheel axles are disposed above upper portions of front wheels, whereby the front wheels are prevented from being impeded by the front wheel axles when the front wheels are steered to maximum angles in a clockwise or counterclockwise direction to an angle greater than or approximate to a right angle with respect to a longitudinal direction of the tractor,
wherein a central differential device is provided to control a difference in revolutions per minute (rpm) of the front wheels and rear wheels with respect to power transmitted from an engine to the front wheels and the rear wheels, and the power is distributed from the central differential device to a front wheel differential device and a rear wheel differential device, wherein the central differential device, the front wheel differential device and the rear wheel differential device are each disposed at a same side of a tractor body frame of the tractor at positions laterally displaced from a central portion of the tractor body frame, wherein the engine is disposed at a portion of the tractor body frame located at a side of the tractor body frame opposite to the side where the central differential device, the front wheel differential device and the rear wheel differential device are disposed.

4. The tractor according to claim 3, wherein a driver cab provided with a driver seat is disposed above an area where the engine is disposed.

5. The tractor according to claim 3, wherein the front wheel axles are disposed at a position higher than rear wheel axles, and a front wheel propulsion shaft is provided to be inclined upwards, the front wheel propulsion shaft transmitting power from the central differential device to the front wheel differential device.

6. A four-wheel drive tractor configured such that front wheel axles are disposed above upper portions of front wheels, whereby the front wheels are prevented from being impeded by the front wheel axles when the front wheels are steered to maximum angles in a clockwise or counterclockwise direction to an angle greater than or approximate to a right angle with respect to a longitudinal direction of the tractor,
wherein a central differential device is provided to control a difference in revolutions per minute (rpm) of the front wheels and rear wheels with respect to power transmitted from an engine to the front wheels and the rear wheels, and the power is distributed from the central differential device to a front wheel differential device and a rear wheel differential device, wherein the central differential device, the front wheel differential device and the rear wheel differential device are each disposed at a same side of a tractor body frame of the tractor at positions laterally displaced from a central portion of the tractor body frame,
further comprising an auxiliary transmission provided rearward of a main transmission that changes a speed of the power generated from the engine, wherein the central differential device is disposed forward of a side portion of the auxiliary transmission, and the power is transmitted from the auxiliary transmission to the central differential device by a power transmission shaft.

7. A four-wheel drive tractor configured such that front wheel axles are disposed above upper portions of front wheels, whereby the front wheels are prevented from being impeded by the front wheel axles when the front wheels are steered to maximum angles in a clockwise or counterclockwise direction to an angle greater than or approximate to a right angle with respect to a longitudinal direction of the tractor,
wherein a central differential device is provided to control a difference in revolutions per minute (rpm) of the front wheels and rear wheels with respect to power transmitted from an engine to the front wheels and the rear wheels, and the power is distributed from the central differential device to a front wheel differential device and a rear wheel differential device, wherein the central differential device, the front wheel differential device and the rear wheel differential device are each disposed at a same side of a tractor body frame of the tractor at positions laterally displaced from a central portion of the tractor body frame,
wherein each of the front wheel axles is provided at an end thereof with a bevel gear, and a bevel gear shaft that extends downwards is connected to the bevel gear so that the corresponding front wheel is driven,
wherein the bevel gear shaft is housed in a swing housing provided so as to be rotatable, wherein the swing housing is rotated by a steering cylinder operated by manipulating a steering wheel, whereby the front wheel is turned
wherein a steering apparatus is provided forward of the front wheel axles, the steering apparatus turning the front wheels, and comprising: a steering cylinder operated by steering force transmitted by hydraulic pressure when the steering wheel is manipulated; and cylinder rods extended and retracted by extension and retraction operation of the steering cylinder, wherein a four-bar link structure is provided on an end of each of the cylinder rods so that the corresponding front wheel can be turned.

8. The tractor according to claim 7, wherein the steering cylinder is supported by a steering cylinder bracket installed on a front wheel axle housing, wherein the steering cylinder bracket supports the steering cylinder such that the steering cylinder is prevented from being moved to the left or the right and is allowed to be moved forwards or rearwards by a predetermined distance.

9. The tractor according to claim 7, wherein each of the four-bar link structures comprises: a swing link hinged at a first end thereof to the corresponding cylinder rod and hinged at a second end thereof to an upper surface of the corresponding front wheel axle; a rod link hinged at a first end thereof to the cylinder rod and the swing link and hinged at a second end thereof to a swing arm; and the swing arm coupled at an end thereof to an upper end of the swing housing so that the swing housing can be rotated by the swing arm.

10. A four-wheel drive tractor configured such that front wheel axles are disposed above upper portions of front wheels, whereby the front wheels are prevented from being impeded by the front wheel axles when the front wheels are steered to maximum angles in a clockwise or counterclockwise direction to an angle greater than or approximate to a right angle with respect to a longitudinal direction of the tractor, wherein a central differential device is provided to control a difference in revolutions per minute (rpm) of the front wheels and rear wheels with respect to power transmitted from an engine to the front wheels and the rear wheels, and the power is distributed from the central differential device to a front wheel differential device and a rear wheel differential device, wherein the central differential device, the front wheel differential device and the rear wheel differential device are each disposed at a same side of a tractor body frame of the tractor at positions laterally displaced from a central portion of the tractor body frame, wherein the front wheel axles are disposed at a position higher than rear wheel axles, and a front wheel propulsion shaft is provided to be inclined upwards, the front wheel propulsion shaft transmitting power from the central differential device to the front wheel differential device.

* * * * *